United States Patent [19]
Magara

[11] Patent Number: 5,580,469
[45] Date of Patent: Dec. 3, 1996

[54] ELECTRICAL DISCHARGE MACHINE WITH PREVENTION OF PULSE CRACK PHENOMENON

[75] Inventor: Takuji Magara, Aichi, Japan

[73] Assignee: Mitsubishi Denki Kabushiki Kaisha, Tokyo, Japan

[21] Appl. No.: 269,350

[22] Filed: Jun. 30, 1994

[30] Foreign Application Priority Data

Jun. 30, 1993 [JP] Japan .................................. 5-162727

[51] Int. Cl.$^6$ .................................................. B23H 1/02
[52] U.S. Cl. ............................. 219/69.18; 219/69.13
[58] Field of Search ................ 219/69.13, 69.17–69.18; 323/282, 284, 351; 363/89–91

[56] References Cited

U.S. PATENT DOCUMENTS

| 2,895,080 | 7/1959 | Branker | 219/69.18 |
| 3,054,931 | 9/1962 | Inoue | 219/69.18 |
| 3,536,881 | 10/1970 | Inoue | 219/69.13 |
| 3,539,755 | 11/1970 | Inoue | 219/69.13 |
| 3,624,338 | 11/1971 | Ellis | 219/69.13 |
| 4,347,424 | 8/1982 | Obara | 219/69.13 |
| 5,126,525 | 6/1992 | Kaneko et al. | 219/69.13 |
| 5,374,798 | 12/1994 | Kinbara | 219/69.18 |

FOREIGN PATENT DOCUMENTS 5078993 11/1973 Japan .
59-161230 9/1984 Japan .

Primary Examiner—Teresa J. Walberg
Assistant Examiner—Raphael Valencia
Attorney, Agent, or Firm—Sughrue, Mion, Zinn, Macpeak & Seas

[57] ABSTRACT

An electrical discharge machine for machining a workpiece with the application of a voltage to a machining gap formed between an electrode and the workpiece which has a direct-current power supply for supplying a machining current and a current limiting device connected in series with the direct-current power supply for limiting the machining current. A switching device is connected in series with the direct-current power supply and current limiting device and is operative to provide a voltage to the machining gap and to form a direct-current pulse. A series circuit of an inductance and a capacitor is provided in parallel with the machining gap. The purpose of the series circuit is either for suppressing the interruption of a direct-current pulse current component which follows a capacitor discharge current component, whereby the occurrence of a pulse crack phenomenon can be prevented or for suppressing the continuation of a direct-current pulse current component, particularly pulses, which follows a capacitor discharge current component. Depending on whether or not the finish is to be of mirror quality, values of capacitance and inductance for the series circuit can be chosen within specified ranges.

10 Claims, 7 Drawing Sheets

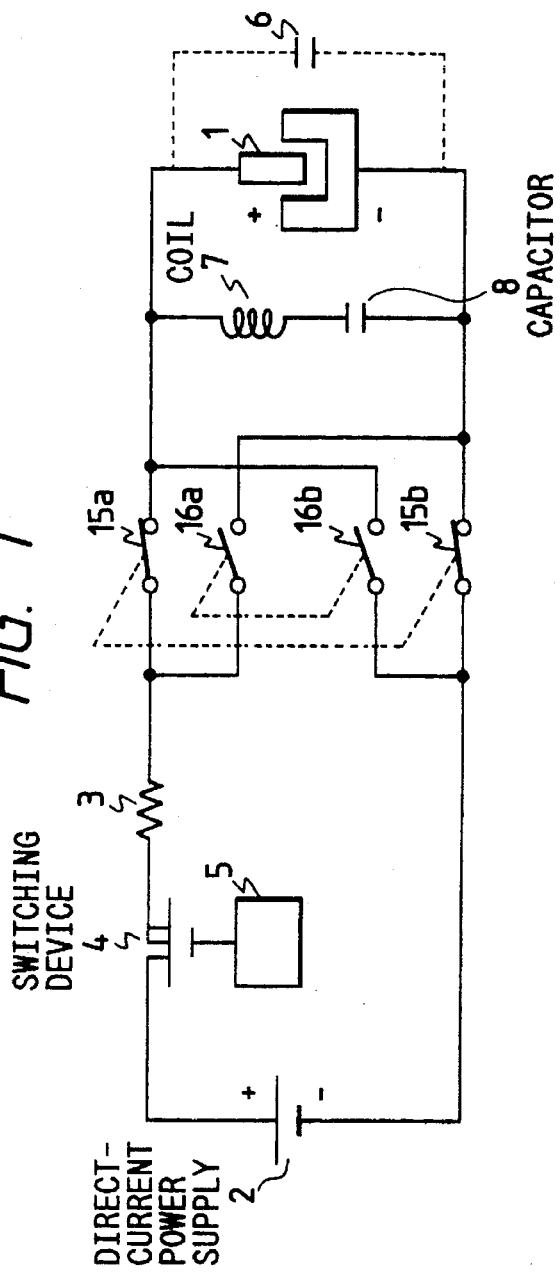
FIG. 1
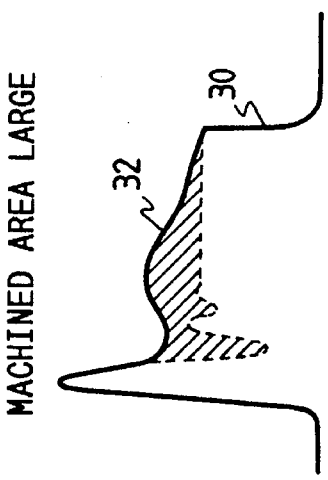
FIG. 2(b) MACHINED AREA LARGE
FIG. 2(a) MACHINED AREA SMALL

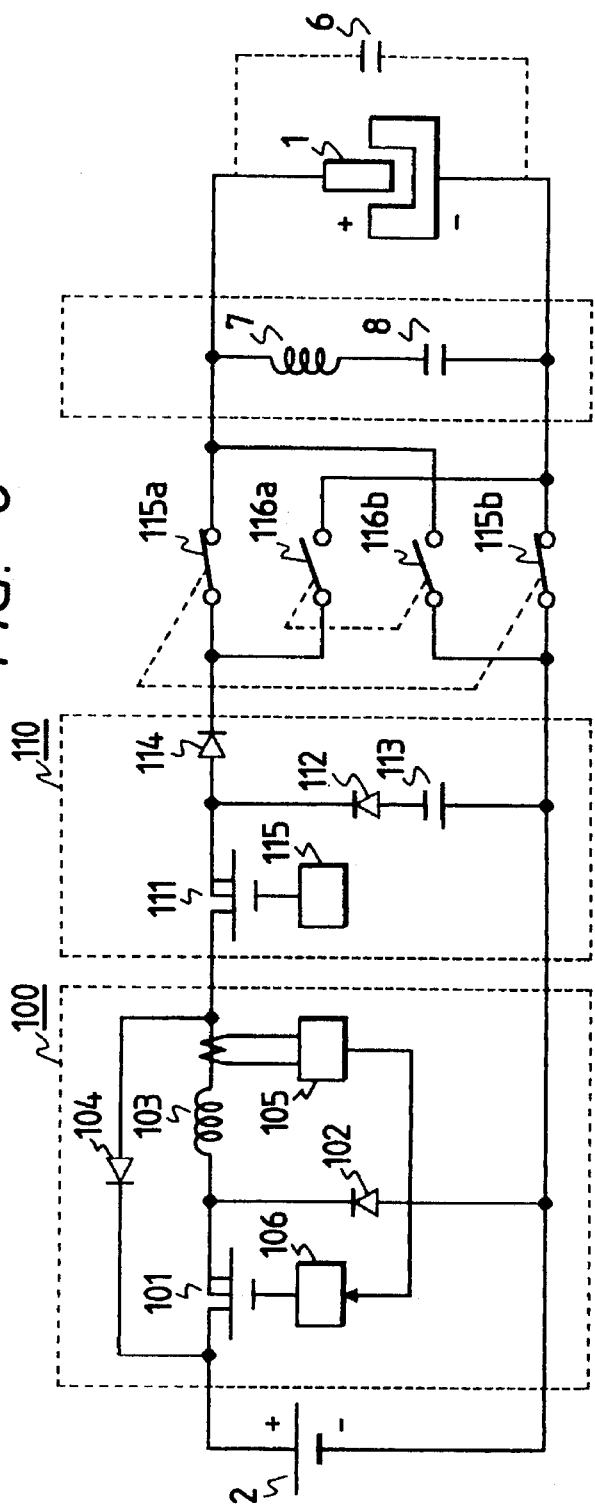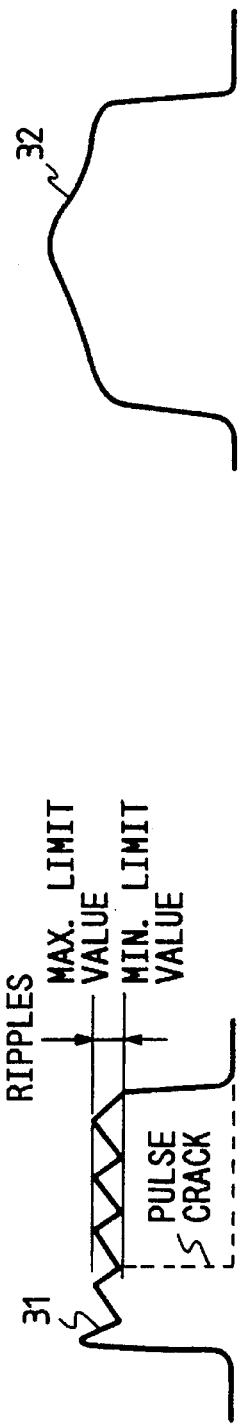

ELECTRICAL DISCHARGE MACHINE WITH PREVENTION OF PULSE CRACK PHENOMENON

BACKGROUND OF THE INVENTION

1. Field of the Invention

The present invention relates to an electrical discharge machine concerned with workpiece finishing and, in particular, mirror finishing.

2. Description of the Background Art

FIG. 13 shows a conventional electrical discharge machine. In the drawing, a machining gap 1 is formed between an electrode and a workpiece. A direct-current power supply 2 has a value of about 80 to 100 V. Also seen in the Figure is a current limiting resistor 3, a switching device 4 which applies a voltage and cuts off an output current, a drive circuit 5 which drives the switching device 4, and a capacitance 6 formed in the portion of the machining gap 1 where the electrode and workpiece are opposed to each other.

During machining, a voltage is applied to the machining gap 1 formed by the electrode and workpiece to machine the workpiece. Namely, the switching device 4 is first turned on by the drive circuit 5 to apply the voltage to the machining gap 1. This applied voltage causes a discharge to take place in the machining gap 1. The discharge is detected by a discharge detection circuit (not shown) and, after a given current pulse duration (pulse width) has elapsed, the switching device 4 is turned off to supply a current pulse of given pulse width. Subsequently, after a given off time, the switching device 4 is turned on again to apply a voltage. The above operation is repeated to machine the workpiece.

It is to be understood that in such machining process, the machining capability and machined surface roughness will depend on the current value of the current pulse supplied to the machining gap 1. In other words, when the current value of the current pulse rises, machining speed increases but machined surface roughness is deteriorated. Also, when the current value of the current pulse falls, machined surface roughness improves but machining speed decreases. Namely, the change in current value of the current pulse provides a desired machining characteristic.

The pulse current value supplied to the machining gap 1, which is determined by the voltage of the direct-current power supply 2 and the value of the current limiting resistor 3, is generally controlled by switching the current limiting resistor 3.

In finishing, which involves a machined surface of good quality, a large value is selected for the current limiting resistor 3. In this case, the change in opposed area of the electrode and workpiece in the machining gap 1 results in a great change in current pulse waveform. Namely, when the opposed area of the machining gap 1 increases, a capacitance is formed in the machining gap. Such an increase in capacitance not only increases a capacitor discharge component 31 occurring prior to a direct-current arc component 30, as shown in FIG. 14(a), but also results in the occurrence of a current waveform in which the arc is cut off after the capacitor discharge 31 and the direct-current arc component 30 does not exist, as shown in FIG. 14(b). When such direct-current arc cut-off, generally referred to as a pulse crack phenomenon, takes place, the workpiece is machined by a capacitor discharge component 31 that is extremely short in pulse width, whereby machining speed reduces and the electrode is consumed significantly. Also, there is a tendency that electrode consumption causes the electrode surface to be toughened and machined surface roughness to be reduced.

The direct-current arc cut-off, i.e., pulse crack phenomenon, is likely to take place when the capacitor (capacitance) is larger and the current limit resistance value is greater. Specifically, when the direct-current power supply 2 is 80 V, the limiting resistor 3 is 10Ω or larger (current value 8 A or less) and the capacitance formed in the machining gap is 1000 pF or more, pulse crack is likely to occur and the machining characteristic tends to deteriorate significantly. Particularly when the current value is 5 A or less, this tendency is important.

In the meantime, as a method for overcoming electrode consumption and improving machining speed, Japanese Laid-Open Patent Publication No. SHO 50-78993 discloses that a series circuit of a not more than 20 µH inductance and a not more than 2 µF capacitor is connected in parallel with a machining gap. This publication teaches that, since machining speed reduces especially at the inductance of 20 µH or higher under the condition that the machining current is 20 A, the most desirable inductance value is 15 µH or lower.

Under the machining condition that the current value is high (not less than 20 A), as indicated in the publication, the pulse crack phenomenon is unlikely to occur naturally. Therefore, an inductance of 20 µH or higher will result in the deterioration of the machining characteristic as described above. However, research by the inventor has shown that when the current value is low, i.e., not more than 8 A (finishing current value), and the inductance is 20 µH or less, the pulse crack phenomenon takes place and leads to an increase in electrode consumption and a reduction in machining speed. As a result, the increase in inductance improves the machining characteristic.

If the machining current is low and the opposed area of the electrode and workpiece increases in the conventional electrical discharge machine arranged as described above, pulse crack where the direct-current arc is cut off occurs frequently. As a result, there is a decrease in machining speed, an increase in electrode consumption, and a reduction in machined surface roughness.

Also, if a series circuit, comprising an inductance of not more than 20 µH inductance and a capacitor, is connected in parallel with the machining gap as disclosed in Japanese Laid-Open Patent Publication No. SHO50-78993, the pulse crack phenomenon often happens especially in machining where an electrode area is large under a finishing condition that the pulse current value is 8 A or less. As a result, there will be an increase in electrode consumption and a reduction in machining speed.

It is to be noted that as another conventional example, Japanese Laid-Open Patent Publication No. SHO50-103791 discloses an arrangement wherein machined surface roughness is improved by connecting a circuit, having a reactance, in series or parallel with a machining gap and by performing machining so as to be tuned and resonated to fundamentals or harmonics in alternating-current components included in the discharge current of a desirable discharge. However, since this example used a capacitor of about 100 pF, the current pulse width is decreased to an extremely small value, thereby increasing electrode consumption significantly.

It is accordingly an object of the present invention to solve the above described problems of the conventional art by providing an electrical discharge machine which can suppress pulse crack in finishing where an electrode area is large, in order to reduce electrode consumption and improve machining speed and machined surface quality.

It is another object of the present invention to provide an electrical discharge machine which can supply a current pulse having a low peak and short pulse width stably, especially in mirror finishing, in order to improve the surface roughness in a large area.

It is a further object of the present invention to provide an electrical discharge machine which consistently ensures optimum finishing in response to the changes in electrode area and machining conditions.

SUMMARY OF THE INVENTION

An electrical discharge machine concerned with the present invention comprises a direct-current power supply which supplies a machining current, a current limiting device which is connected in series with the direct-current power supply to limit the machining current to a finishing current (8 A or less), a switching device which is connected in series with the direct-current power supply and current limiting device, and a series circuit of an inductance (50 to 500 µH) and a capacitor (0.02 to 2 µF) which is provided in parallel with a machining gap to suppress the interruption of a direct-current pulse current component that follows a capacitor discharge current component.

Also, an electrical discharge machine concerned with the present invention comprises a direct-current power supply which supplies a machining current, a current limiting device which is connected in series with the direct-current power supply to limit the machining current to a mirror finishing current (2 A or less), a switching device which is connected in series with the direct-current power supply and current limiting device, and a series circuit of an inductance (20 to 50 µH) and a capacitor (0.001 to 0.02 µF) which is provided in parallel with a machining gap to suppress the continuation of a direct-current pulse current component which follows a capacitor discharge current component.

Also, an electrical discharge machine concerned with the present invention comprises constant-current supplying means which includes a direct-current power supply, a reactor, a diode and a first switching device to supply a finishing current (SA or less), output current on-off means which includes a second switching device, and a series circuit of an inductance (50 to 500 µH) and a capacitor (0.02 to 2 µF) which is provided in parallel with a machining gap to suppress the interruption of a direct-current pulse current component which follows a capacitor discharge current component.

Also, an electrical discharge machine concerned with the present invention comprises constant-current supplying means which includes a direct-current power supply, a reactor, a diode and a first switching device to supply a mirror finishing current (2 A or less), output current on-off means which includes a second switching device, and a series circuit of an inductance (20 to 50 µH) and a capacitor (0.001 to 0.02 µF) which is provided in parallel with a machining gap to suppress the continuation of a direct-current pulse current component which follows a capacitor discharge current component.

Further, an electrical discharge machine concerned with the present invention is any of the electrical discharge machines wherein a plurality of said inductance-and-capacitor series circuits are connected in parallel with the machining gap and switching means is provided to switch between the plurality of series circuits.

BRIEF DESCRIPTION OF THE DRAWINGS

FIG. 1 illustrates the arrangement of a first preferred embodiment of the present invention.

FIGS. 2(a) and 2(b) illustrate current waveforms in the first preferred embodiment of the present invention.

FIG. 8 illustrates the arrangement of the third preferred embodiment of the present invention.

FIGS. 9(a) and 9(b) illustrate current waveforms in the third preferred embodiment of the present invention.

DESCRIPTION OF THE PREFERRED EMBODIMENTS

Figure 3:
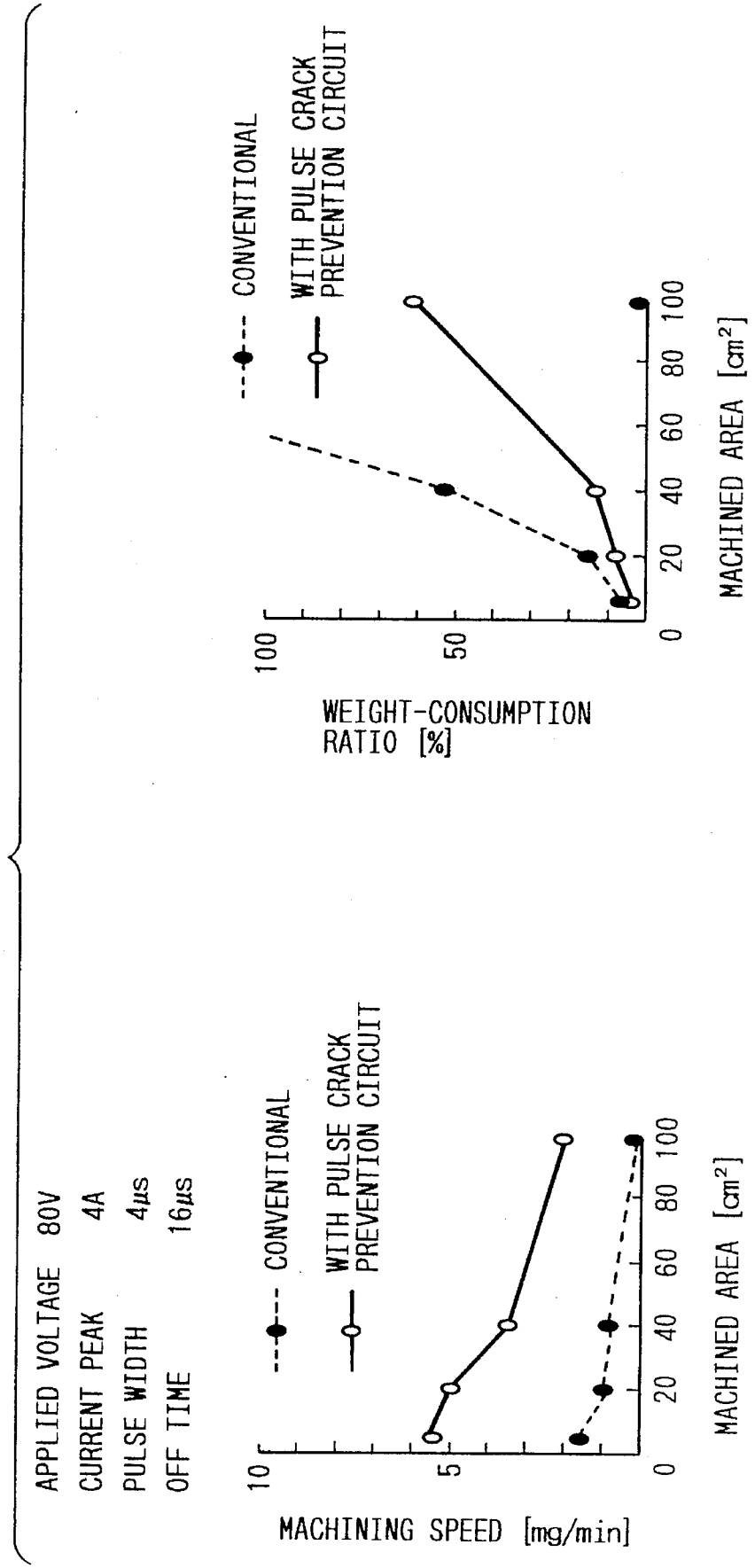
FIG. 3 illustrates machining speed versus machined area and weight-consumption ratio versus machined area in the first preferred embodiment of the present invention.
Figure 4:
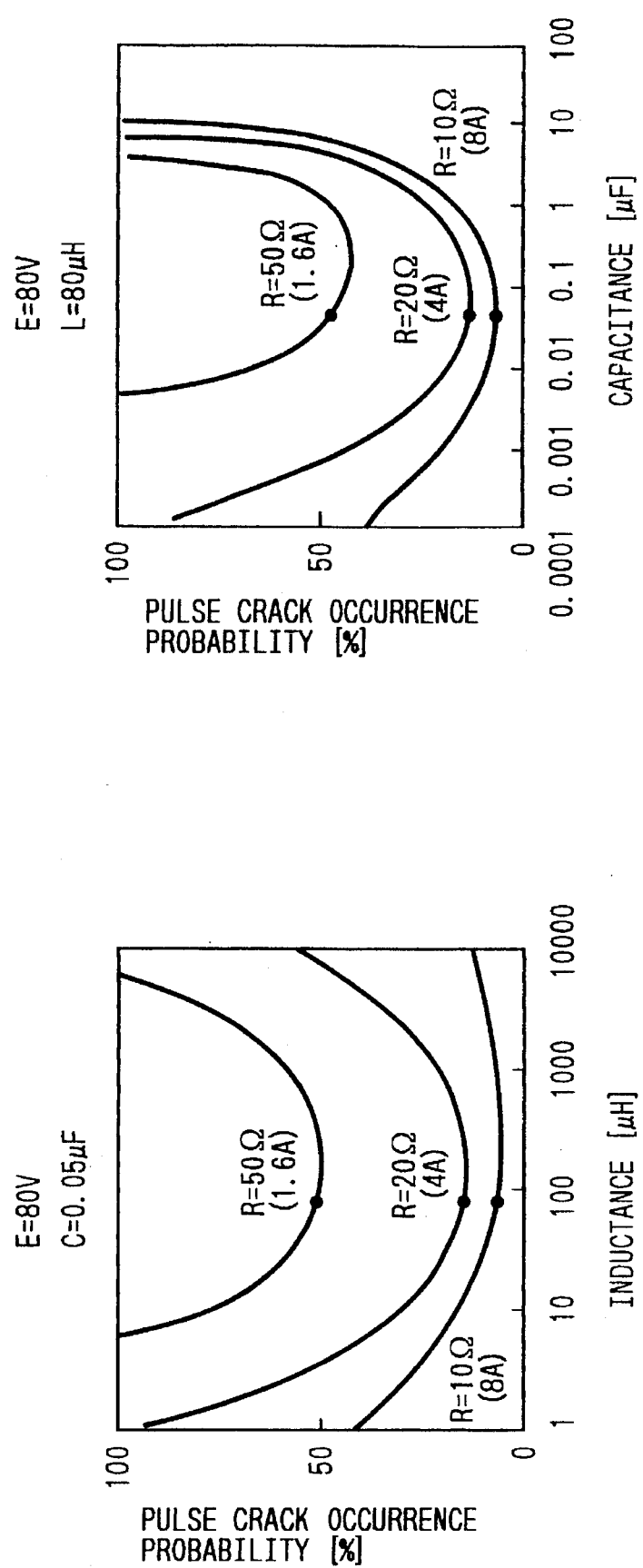
FIG. 4 illustrates inductance/capacitance versus pulse crack occurrence probability in the first and third preferred embodiments of the present invention.

According to the present invention, the interruption of the direct-current pulse current component that follows the capacitor discharge current component can be suppressed during finishing.

Also, according to the present invention, the continuation of the direct-current pulse current component that follows the capacitor discharge current component can be suppressed during mirror finishing.

Further, the electrical discharge machine concerned with the present invention switches between the plurality of inductance-and-capacitor series circuits during machining, whereby the optimum current waveform can be generated for machining in response to the changes in electrode area and machining conditions.

An embodiment of the present invention will now be described in accordance with FIGS. 1 to 4. FIG. 1 shows an embodiment of the present invention, wherein the numeral 1 indicates a machining gap formed by an electrode and a workpiece, 2 denotes a direct-current power supply which supplies a machining current to the machining gap 1, and 3 represents a current limiting resistor which has a value of 10Ω or larger to provide a finishing current (8 A or less) when the direct-current power supply 2 used is 80 V. A switching device 4 applies a voltage and cuts off an output current, a drive circuit 5 drives the switching device 4, a capacitance 6 is formed in the opposed electrode and workpiece portion of the machining gap 1, coil 7 is connected in parallel with the machining gap 1, a capacitor 8 is connected in series with the coil 7, and polarity change-over switches 15a, 15b, 16a and 16b are connected to make electrode polarity positive when the switches 15a, 15b are closed in the present embodiment.

In operation, as in the conventional example, a voltage is applied to the machining gap 1 formed by the electrode and workpiece to machine the workpiece. Namely, the switching device 4 is turned on by the drive circuit 5 to apply the voltage to the machining gap 1, a discharge is subsequently detected by a discharge detection circuit (not shown), and after a given current pulse duration (pulse width) has elapsed, the switching device 4 is turned off to supply a current pulse of given pulse width. Then, after a given off time, the switching device 4 is turned on again to apply a voltage. The above operation is repeated to machine the workpiece.

As in the conventional example, when the opposed area of the machining gap 1 increases, a capacitance is formed in the machining gap. Hence, the capacitor discharge component 31 is first discharged to the machining gap prior to the direct-current arc component 30 but large electrostatic energy charged in the capacitor 8 is supplied to the machining gap via the coil 7 and subsequently a current waveform followed by the direct-current arc component is supplied. FIGS. 2(a) and 2(b) show current waveforms in the present embodiment in which the direct-current pulse component 30 is overlapped by a current component 32 generated by the capacitor 8. It is to be understood that FIG. 2(a) shows the waveform when the machined area is small and FIG. 2(b) shows the waveform when the machined area is large.

The current component 32 of the capacitor 8 has a waveform smoothed by the inductance of the coil 7, whereby a current peak is suppressed to a low value and pulse crack is eliminated to ensure that a waveform followed by the direct-current arc component 30 is provided stably.

The capacitance of the capacitor 8 is much larger than the capacitance formed in the machining gap 1 (normally about several thousand pF) to prevent pulse crack from occurring without fail if the machined area increases.

FIG. 3 shows experimental results wherein machined area versus machining speed (weight machining speed) and weight-consumption ratio (electrode consumption/machined amount) were compared between the present embodiment and the conventional example when the applied voltage is 80 V, the inductance of the coil 7 is 400 µH, the capacitance of the capacitor 8 is 1 µF, and the current limiting resistance is 20Ω (current value 4 A). This drawing shows that by providing pulse crack prevention, the machining speed and electrode consumption are improved greatly as compared to those of the conventional example especially in machining where a machined area is large.

As described above, to prevent pulse crack after the capacitor discharge component 31 and to cause the capacitor discharge to be followed by the direct-current pulse without fail especially in machining using the finishing current pulse of 8 A or less current value, a coil 7 having approximately 50 to 500 µH inductance and a capacitor having approximately 0.02 to 2 µF are used. FIGS. 4(a) and 4(b) show relationships between the inductance/capacitance and pulse crack occurrence probability. This drawing indicates that the pulse crack occurrence probability depends on the combination of inductance and capacitance and that, in particular, the appropriate combination of an inductance between 50 to 500 µH and a capacitor between 0.02 to 2 µH improves the machining characteristic greatly.

Figure 5:
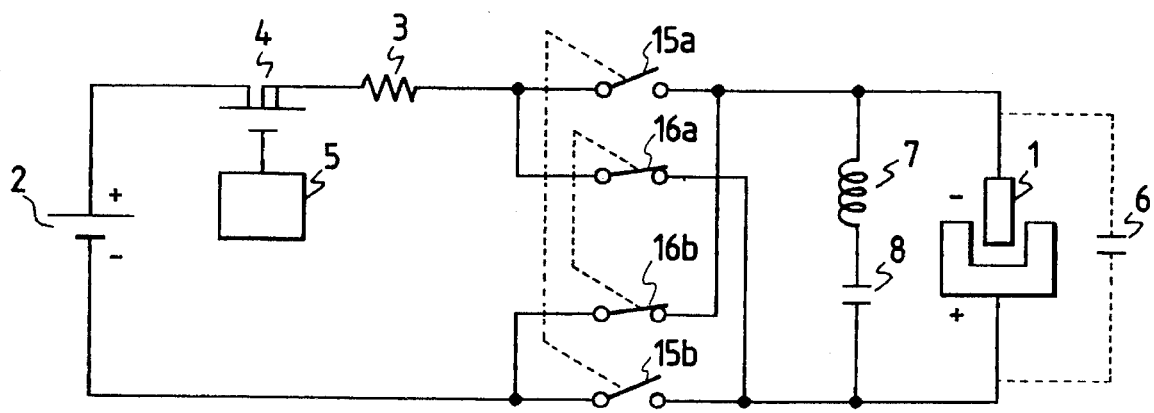
FIG. 5 illustrates the arrangement of a second preferred embodiment of the present invention.
Figure 6A:
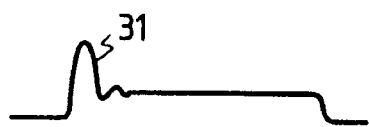
FIGS. 6(a) and 6(b) illustrate current waveforms in the second preferred embodiment of the present invention.
Figure 6B:
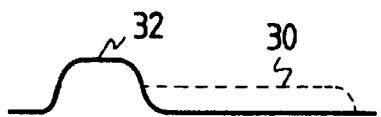
Figure 7:
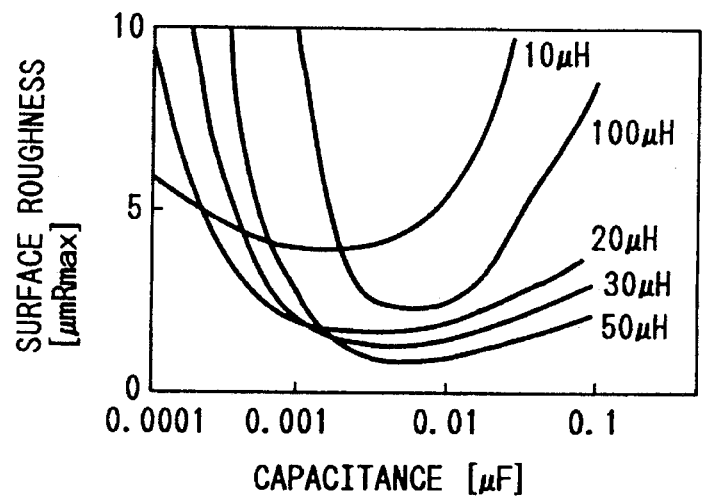
FIG. 7 illustrates inductance/capacitance versus surface roughness in the second and fourth preferred embodiments of the present invention.

The second embodiment of the present invention will now be described in accordance with FIGS. 5 to 7. In FIG. 5, a machining gap 1 formed by an electrode and a workpiece, and a direct-current power supply 2 supplies a machining current to the machining gap 1 and is connected with the machining gap 1 to have polarity opposite to that in the first embodiment, i.e., the electrode is negative and the workpiece is positive. A current limiting resistor 3 having the value of not less than 40Ω provides a mirror finishing current (2 A or less) when the direct-current power supply 2 used is 80 V. A switching device 4 applies a voltage and cuts off an output current, a drive circuit 5 drives the switching device 4, a capacitance 6 is formed in the opposed electrode-workpiece portion of the machining gap 1, a coil 7 is connected in parallel with the machining gap 1, and a capacitor 8 is connected in series with the coil 7. Here, 20 to 50 µH is set for the inductance of the coil 7 and 0.001 to 0.02 µF is set for the capacitance of the capacitor 8.

15a, 15b, 16a and 16b indicate polarity change-over switches which are connected to render electrode polarity negative when the switches 16a, 16b are closed in the present embodiment.

In operation, as in the first embodiment, a voltage is applied to the machining gap 1 formed by the electrode and workpiece to machine the workpiece, i.e., the switching device 4 is turned on by the drive circuit 5 to apply the voltage to the machining gap 1, a discharge is subsequently detected by a discharge detection circuit (not shown), and after a given current pulse duration (pulse width) has elapsed, the switching device 4 is turned off to supply a current pulse of given pulse width. Then, after a given off time, the switching device 4 is turned on again to apply a voltage. The above operation is repeated to machine the workpiece.

As in the first embodiment, when the opposed area of the machining gap 1 increases, a capacitance is formed in the machining gap. Hence, the capacitor discharge component 31 is first discharged to the machining gap prior to the direct-current arc component 30. Subsequently, large electrostatic energy charged in the capacitor 8 is supplied to the machining gap via the coil 7. The present embodiment, wherein the coil 7 and the capacitor 8 are set to small values when the value of the current limiting resistor 3 is 40Ω or greater (current value 2 A or less), provides a current waveform of low peak and short pulse which is not followed by the direct-current arc component 30 unlike the first embodiment. FIGS. 6(a) and 6(b) show current waveforms in the present embodiment which includes only a current component 32 generated mostly by the capacitor 8 and not followed by the direct-current pulse component 30. The current component 32 of the capacitor 8 has a waveform smoothed by the inductance of the coil 7, whereby a current peak is suppressed to a low value and a waveform not having the direct-current arc component 30 is provided stably.

When the workpiece is finished using said waveform of low current peak and short pulse width at the polarity of the negative electrode as in the present embodiment, the workpiece can be machined to a near-mirror surface in a large area. According to the experiments, a workpiece machined with the waveform could be finished to a mirror surface of not more than 1 µm Rmax surface roughness by using a 50 mm-square copper electrode with the inductance of 50 µH and the capacitor of 0.005 µF.

As described above, to ensure that a workpiece is machined with the direct-current pulse cut off after the capacitor discharge component 32 especially in machining using the current pulse of not more than 2 A current value, a coil 7 having an inductance of approximately 20 to 50 μH and a capacitor having a capacitance of approximately 0.001 to 0.02 μF are recommended for use. FIG. 7 shows relationships between the inductance/capacitance and machined surface roughness. This drawing indicates that the machined surface roughness changes according to the combination of inductance and capacitance and that, in particular, the appropriate combination of an inductance between 20 to 500 μH and a capacitor between 0.001 to 0.02 μF improves the machined surface roughness greatly. Especially when the capacitor has the value of 0.001 to 0.005 μF, the pulse width of several μs or less, which falls under a mirror finishing condition, is provided.

A third embodiment of the present invention will now be described in accordance with FIGS. 8 and 9(a)–(b). FIG. 8 shows the embodiment of the present invention, wherein 1 indicates a machining gap formed by an electrode and a workpiece, 2 designates a direct-current power supply, and 100 represents a constant-current supply section which supplies a finishing current (8 A or less). That section is constituted by a first switching device 101, a diode 102 and a reactor 103, and comprises a voltage-dropping chopper of the first switching device 101, the diode 102 and the reactor 103, is connected with a diode 104 between output and input, and includes a current detector 105 which detects the current of the reactor 103. An output current on-off section 110 consists of a series circuit of a second switching device 111, a diode 112 and a voltage source 113, and a diode 114. 106 and 115 denote drive circuits which drive the first switching device 101 and the second switching device 111, respectively. 6 indicates a capacitance formed in the opposed electrode-workpiece portion of the machining gap 1, 7 denotes a coil connected in parallel with the machining gap 1, and 8 represents a capacitor connected in series with the coil 7. Here, 50 to 500 μH is set for the inductance of the coil 7 and 0.02 to 2 μF set for the capacitance of the capacitor 8.

115a, 115b, 116a and 116b designate polarity change-over switches which are connected to render electrode polarity positive when the switches 115a, 115b are closed in the present embodiment.

In operation, when a discharge takes place, a current is supplied to the machining gap 1 by the direct-current power supply 2 through the first switching device 101, the reactor 103, the second switching device 111 and the diode 114. FIGS. 9(a) and 9(b) show current waveforms. This current increases according to a current increase ratio which is determined by the inductance of the reactor 103. When the current reaches a maximum limit value, the current detector 105 turns off the first switching device 101. Supplied thereafter to the machining gap 1 through the diode 102, the reactor 103, the second switching device 111 and the diode 114, the output current decreases. When the current detector 105 detects that the current has reduced down to a minimum limit value, the first switching device 101 is turned on again. The output current then passes through the first switching device 101, the reactor 103, the second switching device 111 and the diode 114, is supplied to the machining gap 1, and increases. This operation is repeated to control the output current to have a waveform as in FIG. 9(a). It is to be understood that the current waveform actually supplied to the machining gap 1 is as shown in FIG. 9(b) because the electrostatic energy of the capacitor 8 connected in parallel with the machining gap is discharged to the machining gap via the coil 7.

After the above operation is repeated for a period of time equivalent to a desired pulse width, the second switching device 111 of the output current on-off section 110 is turned off to cut off the current, whereby the current flow is stopped for the length of desired off time. The above operation is repeated for electrical discharge machining.

In the present embodiment which does not require the current limiting resistor 3 as used in the first embodiment 1, the power supply can be made compact and the power supply without the heat generation and loss of the resistor can be constituted, but when there are no coil 7 and capacitor 8, the current having current ripples as shown in FIG. 9(a) is supplied to the machining gap, whereby the current value approaches zero especially in a finishing current region and a so-called pulse crack phenomenon where a direct-current arc is interrupted is likely to occur. Namely, as compared to the conventional method using the current limit resistor, the present embodiment has a disadvantage that the machining characteristic is likely to be deteriorated by pulse cracking particularly in the finishing current region.

In the present embodiment, when the opposed area of the machining gap 1 increases, a capacitance is formed in the machining gap. Hence, the capacitor discharge component 31 is first discharged to the machining gap 1 prior to the direct-current arc component in FIG. 9(a) but large electrostatic energy charged in the capacitor 8 is supplied to the machining gap via the coil 7 and subsequently a current waveform followed by a direct-current arc component as shown in FIG. 9(b) is supplied. In the waveform provided, the direct-current pulse component 30 is overlapped by a current component 32 generated by the capacitor 8. The current component 32 of the capacitor 8 has a waveform smoothed by the inductance of the coil 7, whereby a current peak is suppressed to a low value and pulse crack attributable to ripples is eliminated to ensure that a waveform followed by the direct-current arc component 30 is provided stably.

It is to be understood that the capacitance of the capacitor 8 is much larger than the capacitance formed in the machining gap 1 (normally about several thousand pF) to prevent pulse crack from occurring without fail if the machined area increases.

In the present embodiment, effects produced by pulse cracking prevention were almost the same as in the experimental results of FIG. 3 indicated in the first embodiment. Both the machining speed and electrode consumption were improved greatly as compared to the conventional example, especially in the machining where a machined area is large.

As described above, to prevent pulse crack after the capacitor discharge component 31 and pulse crack caused by current ripples and to cause the capacitor discharge to be followed by the direct-current pulse without fail especially in machining using the finishing current pulse of 8 A or less current value, the inductance of the coil 7 and capacitance recommended are approximately 50 to 500 μH and 0.02 to 2 μF, respectively, as in the first embodiment.

Figure 10:
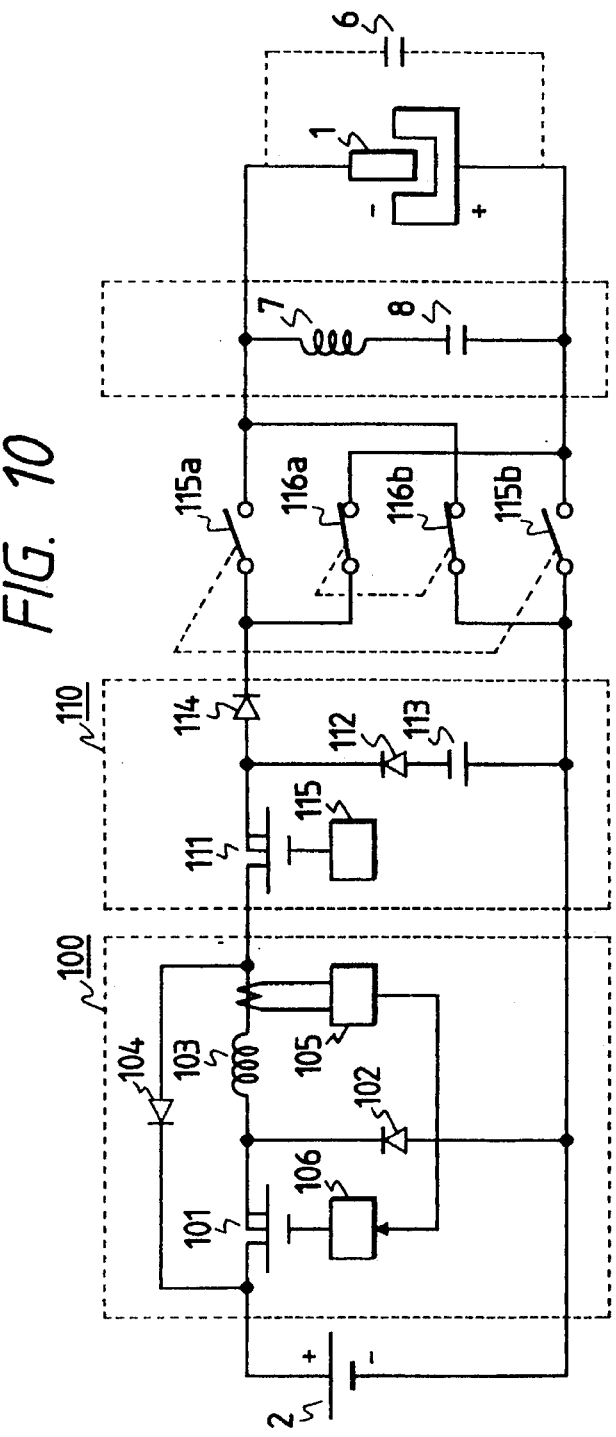
FIG. 10 illustrates the arrangement of the fourth preferred embodiment of the present invention.
Figure 11B:
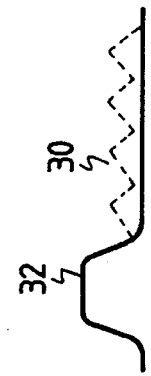
FIGS. 11(a) and 11(b) illustrate current waveforms in the fourth preferred embodiment of the present invention.
Figure 11A:
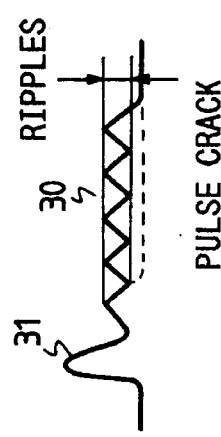

A fourth embodiment of the present invention will now be described in accordance with FIGS. 10 and 11(a)–(b). FIG. 10 shows one embodiment of the present invention, wherein 1 indicates a machining gap formed by an electrode and a workpiece, and 2 designates a direct-current power supply which supplies a machining current to the machining gap 1 and is connected with the machining gap 1 to have polarity opposite to that in the third embodiment, i.e., the electrode is negative and the workpiece is positive. 100 represents a constant-current supply section which is constituted by a first switching device 101, a diode 102 and a reactor 103 to supply a mirror finishing current (2 A or less), comprises a voltage-dropping chopper of the first switching device 101, the diode 102 and the reactor 103, is connected with a diode 104 between output and input, and includes a current detector 105 which detects the current of the reactor 103. An output current on-off section 110 consists of a series circuit of a second switching device 111, a diode 112 and a voltage source 113, and a diode 114. 106 and 115 denote drive circuits which drive the first switching device 101 and the second switching device 111 respectively. 6 indicates a capacitance formed in the opposed electrode-workpiece portion of the machining gap 1, 7 denotes a coil connected in parallel with the machining gap 1, and 8 represents a capacitor connected in series with the coil 7. Here, 20 to 50 μH is set for the inductance of the coil 7 and 0.001 to 0.02 μF set for the capacitance of the capacitor 8.

115a, 115b, 116a and 116b indicate polarity change-over switches which are connected to render electrode polarity negative when the switches 116a, 116b are closed in the present embodiment.

As in the third embodiment, when a discharge takes place, a current is supplied to the machining gap 1 by the direct-current power supply 2 through the first switching device 101, the reactor 103, the second switching device 111 and the diode 114. When the current reaches a maximum limit value, the current detector 105 turns off the first switching device 101. Supplied thereafter to the machining gap 1 through the diode 102, the reactor 103, the second switching device 111 and the diode 114, the output current decreases. When the current detector 105 detects that the current has reduced down to a minimum limit value, the first switching device 101 is turned on again. The output current then passes through the first switching device 101, the reactor 103, the second switching device 111 and the diode 114, is supplied to an electrode 120, and increases. This operation is repeated to control the output current to have a waveform as in FIG. 11(*a*).

After the above operation is repeated for a period of time equivalent to a desired pulse width, the second switching device 111 of the output current on-off section 110 is turned off to cut off the current, whereby the current flow is stopped for the length of desired off time. The above operation is repeated for electrical discharge machining.

As in the third embodiment, when the opposed area of the machining gap 1 increases, a capacitance is formed in the machining gap. Hence, the capacitor discharge component 31 is first discharged to the machining gap 1 prior to the direct-current arc component 30. Subsequently, large electrostatic energy charged in the capacitor 8 is supplied to the machining gap via the coil 7. The present embodiment, wherein the coil 7 and the capacitor 8 are set to small values when the current value is 2 A or less, provides a current waveform of low peak and short pulse which is not followed by the direct-current arc component 30, unlike the third embodiment. FIG. 11(*b*) shows a current waveform in the present embodiment which includes only a current component 32 generated mostly by the capacitor 8 and not followed by the direct-current pulse component 30. The current component 32 of the capacitor 8 has a waveform smoothed by the inductance of the coil 7, whereby a current peak is suppressed to a low value and a waveform not having the direct-current arc component 30 is provided stably.

When the workpiece is finished using said waveform of low current peak and short pulse width at the polarity of the negative electrode as in the present embodiment, the workpiece can be machined to a near-mirror surface in a large area as in the second embodiment. According to the experiments, a workpiece machined with said waveform could be finished to a mirror surface of not more than 0.7 μmRmax surface roughness by using a 60 mm-square copper electrode.

As described above, to ensure that a workpiece is machined with the direct-current pulse cut off after the capacitor discharge component 31 especially in machining using the current pulse of not more than 2 A current value, a coil having an inductance of approximately 50 to 500 μH and a capacitance of approximately 0.2 to 2 μF are recommended for use in accordance with the second embodiment. As already described, according to FIG. 7, machined surface roughness varies depending on the combination of the inductance and capacitance, and the machined surface roughness is improved greatly, especially when the values of inductance between 20 and 50 μH and capacitance between 0.001 and 0.02 μF are combined properly. Especially when the capacitor has the value of 0.001 to 0.005 μH, the pulse width of several μs or less, which falls under a mirror finishing condition, is provided.

Figure 12:
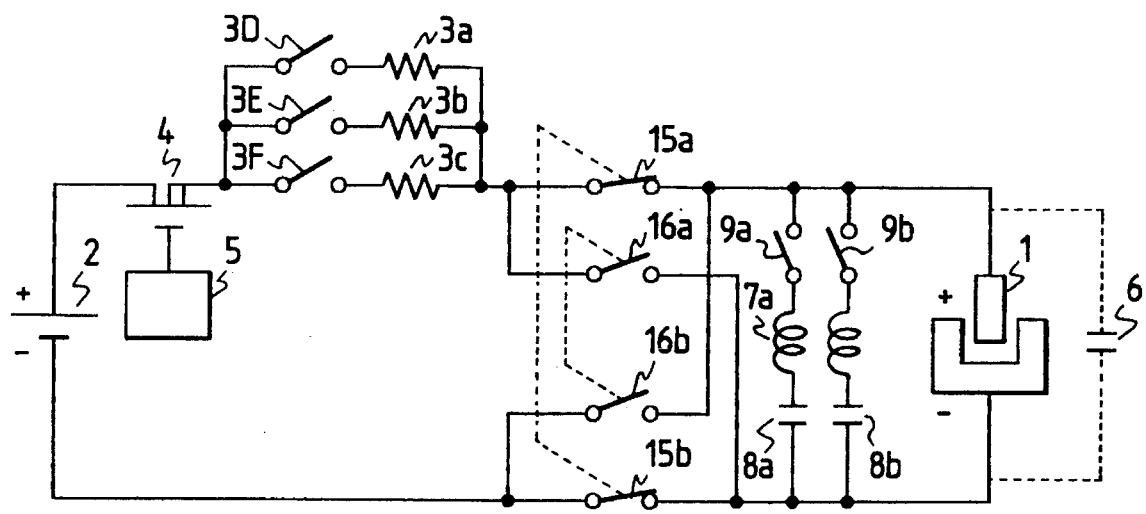
FIG. 12 illustrates the arrangement of a fifth preferred embodiment of the present invention.
Figure 13:
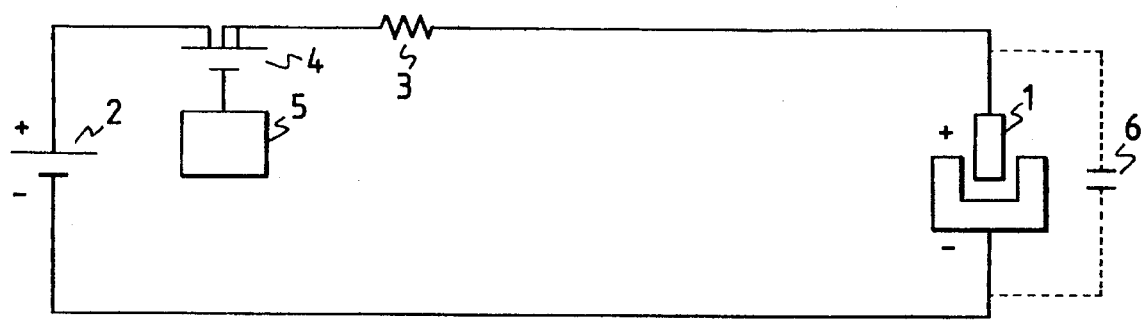
FIG. 13 illustrates the arrangement of a conventional electrical discharge machine.
Figure 14A:
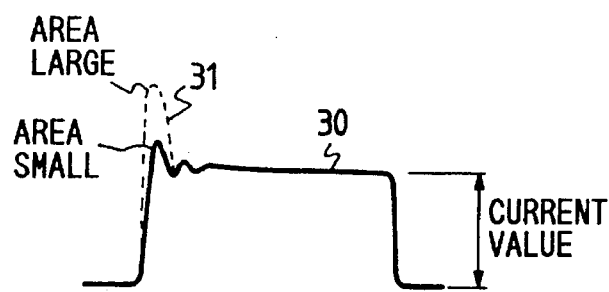
FIGS. 14(a) and 14(b) illustrate current waveforms in the conventional electrical discharge machine.
Figure 14B:
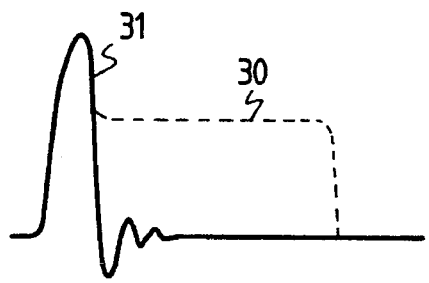

While one series circuit consisting of the coil 7 and the capacitor 8 was connected to the machining gap in the examples of the previously described embodiments, a plurality of series circuits made up of coils, capacitors and switches (a series circuit constituted by a coil 7a, a capacitor 8a and a switch 9a and a series circuit constituted by a coil 7b, a capacitor 8b and a switch 9b) and a plurality of series circuits made up of resistors and switches (a series circuit of a resistor 3a and a switch 3D, a series circuit of a resistor 3b and a switch 3E, and a series circuit of a resistor 3c and a switch 3F) may disposed as shown in FIG. 12 to switch between the switches 3D, 3E, 3F in order to provide a desired machining current value, and to switch between the series circuits consisting of the coils and capacitors by using the switches 9a, 9b constituting the switching means in order to continuously provide an optimum machining characteristic when machining conditions and/or an electrode area are different or change.

It will be apparent that the present invention, as described above, achieves an electrical discharge machine which comprises a direct-current power supply that supplies a machining current, a current limiting device connected in series with said direct-current power supply to limit the machining current to a finishing current, a switching device connected in series with said direct-current power supply and current limiting device, and a series circuit of an inductance and a capacitor provided in parallel with a machining gap to suppress the interruption of a direct-current pulse current component that follows a capacitor discharge current component, whereby the occurrence of pulse crack can be prevented in a finishing current region where an electrode area is large, and electrode consumption is reduced sharply and machining speed is improved remarkably when electrode polarity is positive. Also, the reduction in machined surface quality due to a consumed electrode surface can be prevented.

It will also be apparent that the present invention achieves an electrical discharge machine which comprises a direct-current power supply that supplies a machining current, a current limiting device connected in series with said direct-current power supply to limit the machining current to a mirror finishing current, a switching device connected in series with said direct-current power supply and current limiting device, and a series circuit of an inductance and a capacitor provided in parallel with a machining gap to suppress the continuation of a direct-current pulse current component that follows a capacitor discharge current component, whereby direct-current pulses do not continue after a capacitor discharge during machining, a waveform having a suppressed current peak of a capacitor discharge waveform can be generated for machining, and a current pulse of low peak, and especially when electrode polarity is negative short pulse width can be supplied stably in mirror finishing, and further the best surface roughness is improved remarkably in a large area.

It will also be apparent that the present invention achieves an electrical discharge machine which comprises constant-current supplying means that includes a direct-current power supply, a reactor, a diode and a first switching device to supply a finishing current, output current on-off means including a second switching device, and a series circuit of an inductance and a capacitor provided in parallel with a machining gap to suppress the interruption of a direct-current pulse current component that follows a capacitor discharge current component, whereby the occurrence of a pulse crack phenomenon attributable to an increased machining gap capacitance and current ripples can be prevented in a finishing current region where an electrode area is large, and electrode consumption is reduced sharply and machining speed is improved remarkably especially when electrode polarity is positive. Also, the reduction in machined surface quality due to a consumed electrode surface can be prevented. In addition, since a current limiting resistor is not required, the power supply can be made compact and low in price and the power supply without energy loss and heat generation can be provided.

It will also be apparent that the present invention achieves an electrical discharge machine which comprises constant-current supplying means including a direct-current power supply, a reactor, a diode and a first switching device to supply a mirror finishing current, output current on-off means including a second switching device, and a series circuit of an inductance and a capacitor provided in parallel with a machining gap to suppress the continuation of a direct-current pulse current component that follows a capacitor discharge current component, whereby direct-current pulses do not continue after a capacitor discharge during machining, and a waveform having a suppressed current peak of a capacitor discharge waveform can be generated for machining. Especially when electrode polarity is negative, therefore, a current pulse of low peak and short pulse width can be supplied stably in mirror finishing, and further the best surface roughness is improved remarkably in a large area. Also, since a current limiting resistor is not required, the power supply can be made compact and low in price and the power supply without energy loss and heat generation can be provided.

It will further be apparent that the present invention achieves an electrical discharge machine wherein a plurality of series circuits consisting of inductances and capacitors are provided in parallel with a machining gap and switching means used to switch between said plurality of series circuits is provided to switch between said plurality of series circuits during machining, whereby an optimum current waveform can be generated for machining in accordance with the changes in electrode area and machining conditions to reduce electrode consumption sharply and improve machining speed remarkably. Also, the reduction in machined surface quality due to a consumed electrode surface can be prevented. Further, a current pulse of low peak and short pulse width can be supplied stably particularly in mirror finishing, and moreover the best surface roughness is improved remarkably in a large area.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An electrical discharge machine for machining a workpiece with application of a voltage to a machining gap formed between an electrode and the workpiece, comprising;
    a direct-current power supply for supplying a machining current:
    a current limiting device connected in series with said direct-current power supply for limiting the machining current to a finishing current;
    a switching device connected in series with said direct-current power supply and current limiting device and operative to provide a voltage to said machining gap and to form a direct-current pulse having a pulse width; and a suppressing means for preventing pulse crack in said direct-current pulse, connected in parallel with said machining gap.

2. An electrical discharge machine for machining a workpiece with application of a voltage to a gap formed between an electrode and the workpiece and having a capacitance comprising;
    constant-current supplying means including a direct-current power supply, a reactor connected in series with said power supply, a diode connected in one of series and parallel with said reactor, and a first switching device connected in series with said power supply, for supplying a finishing current:
    output current on-off means including a second switching device which is operative to establish a desired direct-current pulse of a desired width; and
    a suppressing means for preventing pulse crack in said direct-current pulse, connected in parallel with said gap.

3. An electrical discharge machine for machining a workpiece with the application of a voltage to a machining gap formed between an electrode and the workpiece, comprising:
    a direct-current power supply for supplying a machining current;
    a current limiting device connected in series with said direct-current power supply for limiting the machining current to a finishing current;
    a switching device connected in series with said direct-current power supply and current limiting device and operative to provide a voltage to said machining gap and to form a direct-current pulse having a pulse width and
    a series circuit of an inductance and a capacitor provided in parallel with said machining gap for suppressing the interruption of a direct-current pulse current component which follows a capacitor discharge current component;
    wherein a finishing current value is 8 A or less, the value of the inductance in the series circuit is 50 to 500 µH, and the value of the capacitor in the series circuit is 0.02 to 2 µF.

4. The electrical discharge machine as defined in claim 3, wherein a plurality of said inductance-and-capacitor series circuits are connected in parallel with the machining gap and switching means is provided for switching between said plurality of series circuits.

5. An electrical discharge machine for machining a workpiece with the application of a voltage to a machining gap formed between an electrode and the workpiece and having a capacitance, comprising:

a direct-current power supply for supplying a machining current;

a current limiting device connected in series with said direct-current power supply for limiting the machining current to a mirror finishing currents.

a switching device connected in series with said direct-current power supply and current limiting device and operative to provide a voltage to said machining gap and to form a direct-current pulse having a pulse width; and a series circuit of an inductance and a capacitor provided in parallel with said machining gap for suppressing the continuation of a direct-current pulse current component which follows a capacitor discharge current component;

wherein a mirror finishing current value is 2 A or less, the value of the inductance in the series circuit is 20 to 50 µH, and the value of the capacitor in the series circuit is 0.001 to 0.02 µF.

6. The electrical discharge machine as defined in claim 5, wherein a plurality of said inductance-and-capacitor series circuits are connected in parallel with the machining gap and switching means is provided for switching between said plurality of series circuits.

7. An electrical discharge machine for machining a workpiece with the application of a voltage to a gap formed between an electrode and the workpiece and having a capacitance, comprising:

constant-current supplying means, including a direct-current power supply, a reactor connected in series with said power supply,. a diode connected to said reactor, and a first switching device connected in series with said power supply for supplying a finishing current;

output current on-off means including a second switching device in series with said constant current supplying means, which is operative to establish a desired pulse width; and a series circuit of an inductance and a capacitor provided in parallel with said machining gap for suppressing the interruption of a direct-current pulse current component which allows a capacitor discharge current component;

wherein a finishing current value is 8 A or less, the value of the inductance in the series circuit is 50 to 500 µH, and the value of the capacitor in the series circuit is 0.02 to 2 µF.

8. The electrical discharge machine as defined in claim 7, wherein a plurality of said inductance-and-capacitor series circuits are connected in parallel with the machining gap and switching means is provided for switching between said plurality of series circuits.

9. An electrical discharge machine for machining a workpiece with the application of a voltage to a machining gap formed between an electrode and the workpiece, comprising:

constant-current supplying means including a direct-current power supply, a reactor in series with said power supply, a diode connected to said reactor, and a first switching device in series with said power supply, for supplying a mirror finishing current;

output current on-off means including a second switching device in series with said constant-current supplying means, which is operative to establish a current pulse of a desired width; and a series circuit of an inductance and a capacitor provided in parallel with said machining gap for suppressing the continuation of a direct-current pulse current component which follows a capacitor discharge current component;

wherein a mirror finishing current value is 2 A or less, the value of the inductance in the series circuit is 20 to 50 µH, and the value of the capacitor in the series circuit is 0.001 to 0.02 µF.

10. The electrical discharge machine as defined in claim 9, wherein a plurality of said inductance-and-capacitor series circuits are connected in parallel with the machining gap and switching means is provided for switching between said plurality of series circuits.

* * * * *